G. S. WHITFIELD.
COLOR PHOTOGRAPHY.
APPLICATION FILED NOV. 18, 1914.
1,144,575.
Patented June 29, 1915.
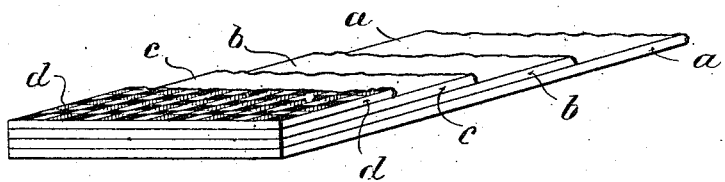

UNITED STATES PATENT OFFICE.

GEORGE SYDNEY WHITFIELD, OF WATFORD, ENGLAND.

COLOR PHOTOGRAPHY.

1,144,575.  Specification of Letters Patent.  Patented June 29, 1915.

Application filed November 18, 1914. Serial No. 872,813.

*To all whom it may concern:*

Be it known that I, GEORGE SYDNEY WHITFIELD, a subject of the King of Great Britain and Ireland, residing at Watford, in the county of Herts, England, have invented Improvements in or Relating to Color Photography, of which the following is a specification.

The present invention relates to the improved production, in regular pattern screen practice, of photographs in color on a flexible opaque medium, paper for example, subject to expansion and contraction by the presence of moisture and it has principally for its object procedure whereby, notwithstanding this disadvantage, accurate permanent registration can be secured between a combined color record and regular pattern viewing screen on the said flexible medium, hereinafter referred to as paper. Obviously, the viewing screen must be identical in pattern with the taking screen employed to produce the color record negative to be copied.

Owing to the fineness of the pattern of the color screens used, displacement as slight as one three hundredth part of an inch between the combined screen and color record suffices to falsify the result. Since such displacement would not only occur in each separate unit (one inch) of length in the length and width of the medium, but probably also to a somewhat different extent (less or more) in each such unit it would result that to effect accurate registration would be difficult or impossible.

Nor can the error be allowed for by estimating the proportion of moisture present in the paper and, after any treatment affecting such proportion, ultimately restoring that proportion before permanently associating the color record and the paper bearing the picture since such restoration does not also restore the original dimensions but leaves them greater or less than they originally were.

These disadvantages are wholly overcome by the present invention according to which the dimensions of the paper are maintained constant, notwithstanding tendencies to the contrary, from the time when the paper is ready to receive the color record until it and the color record are in permanent contact with the viewing screen.

Sometimes in order to heighten the color effect the paper is provided with a metallic reflective backing as hereinafter more particularly described.

The accompanying drawing represents in greatly enlarged form a broken perspective view of a color photograph of the kind hereinbefore described produced according to the present invention and comprising the said reflective backing.

In this representation $a$ represents the paper support, $b$ the metallic reflective backing, $c$ the color record and $d$ one type of a regular pattern viewing screen in correct register with the color record.

The carrying out of the invention is suitably effected in the following manner:— Starting with paper to which a light sensitive coating has been applied and after the said coating, suitably a gelatin emulsion, is dry, the paper is saturated with water until it has become expanded to the fullest practicable extent after which, and while thus expanded, it is applied to the color record negative to be copied, exposed, and without intermediate drying, developed, fixed, washed, applied to the viewing screen with which it is then carefully registered, which operation can be effected in full daylight and, while still in its fully expanded condition permanently secured thereto, thus rendering unalterable the positional relationship between the viewing screen and the paper. When a non-gelatin emulsion has been used it may be needful to employ an adhesive to permanently secure the two elements to one another.

It is to be observed moreover that unless the paper be wet when applied to the viewing screen there could not be obtained sufficiently close contact between the two for insuring accurate registration. It will also be clear that if dry paper be exposed behind the color record negative, such paper would, when afterward wetted in the developing and fixing treatment be so altered in size as to put the image quite out of register.

In carrying out the invention the viewing screen for convenience of manipulation is carried by a temporary support from which it and the combined color record can, when dry, be ultimately stripped.

In order to enhance the brilliancy of the effect the paper before being provided with the light sensitive coating is or may be provided with a bright metallic or like coating, advantageously silver, applied in a finely divided condition, it may be in the form of powder for instance, or deposited *in situ,* so as to permit of the expansion of the paper without injury to the said paper or the metallic coating.

What I claim is:—

1. The process of producing a combined color record and viewing screen of the kind referred to on a flexible medium consisting in expanding said flexible medium as fully as practicable and maintaining it in such expanded state notwithstanding contrary tendencies, from the time when it is ready to receive the color record until said color record and a corresponding viewing screen are placed in permanent contact.

2. The process of producing a combined color record and viewing screen of the kind referred to on a flexible medium consisting in causing said flexible medium carrying a light sensitive coating, to absorb moisture until it is thereby expanded to the practicable limit, producing the color record on said flexible medium without intermediate drying and maintaining it in such wet and expanded condition throughout all subsequent treatment until said color record and a corresponding viewing screen are placed in permanent contact.

3. The process of producing a combined color record and viewing screen of the kind referred to on a flexible medium consisting in coating said flexible medium with a light sensitive coating, drying said coated flexible medium, afterward wetting it with water until it is thereby expanded to the practicable limit, exposing it in such condition through a transparency previously taken through a regular pattern screen corresponding to the viewing screen and maintaining it in said wet and expanded condition through all intermediate treatments until said color record and the viewing screen are placed in permanent contact.

4. The process of producing a combined color record and viewing screen of the kind referred to on paper, consisting in expanding said paper as fully as practicable and maintaining it in such expanded state notwithstanding contrary tendencies, from the time when it is ready to receive the color record until said color record and a corresponding viewing screen are placed in permanent contact.

5. The process of producing a combined color record and viewing screen of the kind referred to on paper consisting in causing said paper carrying a light sensitive coating, to absorb moisture until it is thereby expanded to the practicable limit, producing the color record on said paper without intermediate drying and maintaining it in such wet and expanded condition throughout all subsequent treatment until said color record and a corresponding viewing screen are placed in permanent contact.

6. The process of producing a combined color record and viewing screen of the kind referred to on paper consisting in coating said paper with a light sensitive coating, drying said coated paper, afterward wetting it with water until it is thereby expanded to the practicable limit, exposing it in such condition through a transparency previously taken through a regular pattern screen corresponding to the viewing screen and maintaining it in said wet and expanded condition through all intermediate treatments until said color record and the viewing screen are placed in permanent contact.

7. The process of producing a combined color record and viewing screen of the kind referred to on a flexible medium consisting in causing said flexible medium carrying a light sensitive coating, to absorb moisture until it is thereby expanded to the practicable limit, producing the color record on said flexible medium without intermediate drying, maintaining it in such expanded condition until it is ready to be combined with a corresponding viewing screen, visually registering said color record in full daylight and while thus registered permanently combining said color record and viewing screen.

8. The process of producing a combined color record and viewing screen of the kind referred to on a flexible medium consisting in causing said flexible medium carrying a light sensitive coating, to absorb moisture until it is thereby expanded to the practicable limit, producing the color record on said flexible medium without intermediate drying, maintaining it in such expanded condition until it is ready to be combined with a corresponding viewing screen, mounting said viewing screen on a temporary support, visually registering said color record, without intermediate drying, with said viewing screen and while thus registered permanently combining said color record and viewing screen and removing said temporary support.

9. The process of producing a combined color record and viewing screen of the kind referred to on a flexible medium consisting in coating said flexible medium with a light sensitive coating, drying said coated flexible medium, afterward wetting it with water until it is thereby expanded to the practicable limit, exposing it in such condition through a transparency taken through a regular pattern viewing screen having strong colors, maintaining it in said wet and expanded condition throughout all intermediate treatments until said color record is ready to be combined with a viewing screen and permanently combining it without intermediate drying with a viewing screen having weak colors.

10. As a new article of manufacture a color photograph comprising a color record, a viewing screen in correct register therewith and permanently attached to said color record, a flexible support carrying said viewing screen and color record and, between the latter and the flexible support, a metallic reflective backing serving to heighten the color effect.

Signed at London, England, this 4th day of November, 1914.

GEORGE SYDNEY WHITFIELD.

Witnesses:
H. D. JAMESON,
A. H. STEVENS.

Copies of this patent may be obtained for five cents each, by addressing the "Commissioner of Patents, Washington, D. C."